United States Patent [19]

Jacobson

[11] Patent Number: 4,737,194

[45] Date of Patent: Apr. 12, 1988

[54] TITANIUM DIOXIDE PIGMENT COATED WITH CERIUM CATIONS, SELECTED ACID ANIONS, AND ALUMINA

[75] Inventor: Howard W. Jacobson, Wilmington, Del.

[73] Assignee: E. I. Du Pont de Nemours and Company, Wilmington, Del.

[21] Appl. No.: 857,325

[22] Filed: Apr. 30, 1986

[51] Int. Cl.$^4$ .............................................. C04B 14/30
[52] U.S. Cl. ..................... 106/300; 106/299; 106/308 B; 106/308 Q
[58] Field of Search ............... 106/299, 300, 308 B, 106/308 Q

[56] References Cited

U.S. PATENT DOCUMENTS

| | | | |
|---|---|---|---|
| 3,506,466 | 4/1970 | Bramekamp et al. | 106/300 |
| 3,513,007 | 5/1970 | Lederer | 106/300 |
| 3,859,109 | 1/1975 | Wiseman et al. | 106/300 |
| 3,941,603 | 3/1976 | Schmidt | 106/300 |
| 4,022,632 | 5/1977 | Newland et al. | 106/300 |
| 4,052,222 | 10/1977 | Howard | 106/300 |
| 4,052,223 | 10/1977 | Howard | 106/308 B |
| 4,183,768 | 1/1980 | Knapp et al. | 106/300 |
| 4,239,548 | 12/1980 | Barnard et al. | 106/300 |
| 4,447,270 | 5/1984 | Howard et al. | 106/300 |
| 4,447,271 | 5/1984 | Howard et al. | 106/300 |
| 4,461,810 | 7/1984 | Jacobson | 106/300 |

*Primary Examiner*—Paul Lieberman
*Assistant Examiner*—Willie J. Thompson
*Attorney, Agent, or Firm*—David J. Gould

[57] ABSTRACT

A pigment consisting essentially of rutile $TiO_2$ particles coated with alumina or alumina-silica, and having particle surfaces associated with cerium cations and borate anions or water-soluble polyfunctional organic acid anions, is useful in coating compositions.

20 Claims, No Drawings

TITANIUM DIOXIDE PIGMENT COATED WITH CERIUM CATIONS, SELECTED ACID ANIONS, AND ALUMINA

BACKGROUND OF THE INVENTION

The present invention relates generally to pigments composed of coated $TiO_2$ particles, and particularly to $TiO_2$ pigments having coatings comprising cerium cations, selected acid anions, and an outer coating of alumina.

$TiO_2$ has a high refractive index for its density, which renders it a superior pigment for use in coatings, e.g., paints. However, $TiO_2$ is photoactive; exposure to ultraviolet radiation results in generation of free radicals on the surface of $TiO_2$ particles. Thus, where a $TiO_2$ pigment is employed in a paint exposed to sunlight, free radicals are generated which can migrate to the film-forming component of the paint, resulting in coating degradation or failure.

Therefore, minimizing free radical migration is desirable in order to provide lightfast and stable pigments for coating use. Heretofore, the majority of commercial $TiO_2$ pigments have been coated with dense silica or densified alumina to provide lightfastness. However, some patent references have disclosed use of cerium in association with $TiO_2$ pigments to promote lightfastness.

Lederer, U.S. Pat. No. 3,513,007, discloses $TiO_2$ particles having coatings formed from dispersions containing water-soluble hydrolyzable compounds of silicon, titanium, zirconium, or phosphorus, to which water-soluble hydrolyzable compounds of aluminum, cerium, and or calcium and alkali are added.

Barnard, U.S. Pat. No. 4,239,548, discloses pigments having inner coatings comprising cerium and phosphate radicals and outer coatings comprising aluminum and phosphate radicals and optionally hydrous alumina.

Jacobson, U.S. Pat. No. 4,460,655, describes pigments of $TiO_2$ particles associated with compounds selected from the group consisting of $Na_7Ce_6F_{31}$, $K_7Ce_6F_{31}$, $Li_7Ce_6F_{31}$, and $(NH_4)_7Ce_6F_{31}$.

Jacobson, U.S. Pat. No. 4,461,810, discloses pigments of $TiO_2$ particles, the surfaces of which are associated with cerium cations and sulfate, phosphate, or silicate anions. The particles are also provided with an outer coating of alumina.

Newland et al., U.S. Pat. No. 4,022,632, describes $TiO_2$ pigments treated with carboxylate salts of cobalt, cerium, or manganese.

Bramekamp, U.S. Pat. No. 3,506,466, discloses $TiO_2$ pigment particles coated with inorganic oxides, where the inorganic oxide bears on its surface an amine salt of an oxycarboxylic acid selected from the group consisting of lactic, citric, malic, tartaric, and glycolic acids.

It has now been found that pigments of $TiO_2$ particles treated with cerium cations in association with certain polyfunctional water-soluble acid anions or borate ions, and then topcoated with alumina, exhibit excellent lightfastness, gloss, and dispersion characteristics.

SUMMARY OF THE INVENTION

The present invention provides a pigment consisting essentially of rutile $TiO_2$ particles bearing coatings of alumina or alumina-silica, the particle surfaces having associated therewith 0.05-2%, by weight of the $TiO_2$, of cerium cations and an associated quantity of borate anions or polyfunctional organic acid anions having a solubility in water of at least 10 grams per liter at 25° C.

DETAILED DESCRIPTION OF THE INVENTION

The pigments of the present invention are composed of rutile $TiO_2$ particles treated with cerium cations in association with selected polyfunctional organic acid anions such as citrate anions, and then topcoated with alumina or alumina-silica. Optionally, the acid anions can be borate. In extreme lightfastness exposures, the pigments of this invention provide performance equivalent to $TiO_2$ coated with 6% by weight silica and 2% by weight alumina. It is believed that cerium citrate in association with the $TiO_2$ particle surfaces provides recombination centers for electron/hole pairs produced when pigments containing such particles are exposed to actinic radiation. Quenching of electron/hole pairs eliminates free radical production which might otherwise degrade a paint film or other organic materials in proximity to pigment particles.

The $TiO_2$ used to prepare the pigment of the invention can be of the conventional rutile variety, prepared by either the chloride or sulfate process.

Associated with the particle surfaces of the $TiO_2$ are cerium cations and selected acid anions. "Associated with the particle surfaces" means that the ions are bound to the $TiO_2$ particles by a chemical or physical attraction.

The acid anions associated with the cerium cations are borate anions or polyfunctional organic acid anions having water solubilities greater than 10 grams per liter at 25° C. Exemplary of such organic acid anions are citrate, succinate, fumarate, adipate, tartrate, and maleate ions. Of the foregoing, citrate ions are preferred.

The cerium cations can be supplied by any water-soluble cerium salt, e.g., ceric sulfate or ceric nitrate, which are added to rutile slurries at pH 2-7. Polyfunctional organic acid anions are supplied by addition of the appropriate acid. Borate anions are supplied by addition of $Na_2B_2O_4$. The cerium and borate ion content of the pigment can be determined by ion plasma chromatography. The polyfunctional organic acid anion content can be determined using a Leco or other total carbon analyzer.

The amount of alumina or alumina-silica which the particles bear as coatings can be varied depending primarily upon the pigment's intended use. Ordinarily, the alumina coating will constitute 0.5-10% of the total weight of the particles. Preferably, the alumina coating constitutes 1-6%, and most preferably, 2-4%, of the total weight of the pigment particles. The amount of alumina the particles bear as coatings, expressed as percent by weight, is calculated by first determining, by ion plasma spectroscopy, the alumina content of the coated pigment. The alumina content of the uncoated rutile $TiO_2$ is similarly determined, and the alumina content attributable to the coating is determined by computing the difference between coated and uncoated alumina contents.

The pigment of the present invention can be prepared from an aqueous slurry containing 200-450 grams per liter $TiO_2$. This slurry is brought to 45°-70° C. and is held at that temperature throughout the preparation procedure. The slurry is adjusted to a pH at which added cerium ions will remain in solution by addition of mineral acid, e.g., HCl, and then sufficient cerium salt is added to provide a cerium ion concentration in the slurry of 0.05-2%, by weight of the $TiO_2$. For example, if cerium ions are supplied by addition of ceric nitrate, pH should be adjusted to 2-4; if cerium ions are added in the form of ceric sulfate, pH should be adjusted to the range 2-7.

At this point, a sufficient quantity of a selected anion species (i.e, organic acid or borate) is added to the slurry to provide a concentration of added anion ranging from 100% to 300% of the cerium ion concentration. As a result, cerium will precipitate upon the surfaces of the $TiO_2$ particles in association with the added anion.

Alumina is then precipitated on the $TiO_2$ particles by slowly adding enough sodium aluminate to the slurry to provide a concentration of about 2-8% by weight of the $TiO_2$. Acid, normally sulfuric or hydrochloric, is added at the same time to maintain the pH of the slurry within the range 6-9 during the precipitation step. After addition of aluminate is complete, the slurry is allowed to cure, with continuous stirring, for 15-30 minutes.

The resulting pigment is then separated from the liquid by filtration or centrifugation, washed with water, and dried.

Coating compositions can be prepared with the pigments of the invention in conventional ways, e.g., by blending the pigment with a film-forming component and a liquid carrier.

The following examples illustrate particular aspects of the present invention. In the examples, all parts and percentages are by weight and all degrees are Celsius unless otherwise indicated.

EXAMPLE 1

In a large plastic vessel equipped with stirring apparatus and a pH probe, 11,000 parts water are mixed with 5000 parts rutile $TiO_2$.

The resulting slurry is heated to 60°, and the pH is adjusted to about 3.0 by addition of HCl. 42 parts of a 1.5 M $Ce(NO_3)_4$ solution are then added, followed by 40 parts citric acid. The resulting mixture is then stirred for a period of about 5 minutes, and then the pH is increased to about 7.5 by addition of NaOH.

A coating of 2% hydrous alumina is then deposited on the pigment by simultaneously adding 250 mL $NaAlO_2$ solution (containing the equivalent of 400 g $Al_2O_3$ per liter solution) and HCl, such that the pH of the slurry is continuously maintained from about 7.0 to about 7.5.

The resulting coated pigment is cured by holding for about 30 minutes at 60° and pH 7.5. The pigment is then filtered from the slurry, washed free of salts with deionized water, and air-dried. The pigment is then micronized, using 3 lbs. superheated steam per lb. pigment. The resulting pigment, containing about 0.2% $CeO_2$ as $Ce_3(C_6H_5O_7)_4$, and a 2.0% alumina coating, is suitable for use in paint systems.

EXAMPLE 2

A mill base is made by mixing
Pigment of Example 1—387 parts
alkyd resin (Syntex ® 3145; Celanese Coatings Co.)—149.6 parts
n-butanol—9.4 parts
xylol—79 parts.

This mixture is sand ground, and then the sand is filtered from the mill base. A paint is made by mixing 100 parts of the mill base with the following:

xylol—1.4 parts
alkyd resin (Syntex ® 3145; Celanese Coatings Co.)—71.8 parts
melamine resin solution (Cymel ® 248-8, 55% solids, American Cyanamid Co.)—38.5 parts.

What is claimed is:

1. A pigment consisting essentially of rutile $TiO_2$ particles bearing coatings of alumina or alumina-silica, the particle surfaces having associated therewith 0.05-2%, by weight of the $TiO_2$, of cerium cations and an associated quantity of borate anions or polyfunctional organic acid anions having a solubility in water of at least 10 grams per liter at 25° C.

2. A pigment according to claim 1, wherein the alumina or alumina-silica coating constitutes 0.5-10% of the total weight of the $TiO_2$ particles.

3. A pigment according to claim 2, wherein the alumina or alumina-silica coating constitutes 1-6% of the total weight of the $TiO_2$ particles.

4. A pigment according to claim 3, wherein the alumina or alumina-silica coating constitutes 2-4% of the total weight of the $TiO_2$ particles.

5. A pigment according to claim 1, wherein the associated anions are borate ions.

6. A pigment according to claim 1, wherein the associated anions are polyfunctional organic acid anions having a solubility in water of at least 10 grams per liter at 25° C.

7. A pigment according to claim 1, wherein the associated anions are selected from the group consisting of citrate, succinate, fumarate, adipate, tartrate, and maleate ions.

8. A pigment according to claim 1, wherein the associated anions are citrate ions.

9. A pigment according to claim 2, wherein the associated anions are citrate ions.

10. A pigment according to claim 3, wherein the associated anions are citrate ions.

11. A pigment according to claim 4, wherein the associated anions are citrate ions.

12. A coating composition comprising a pigment according to claim 1, a film-forming material, and a liquid carrier.

13. A coating composition comprising a pigment according to claim 2, a film-forming material, and a liquid carrier.

14. A coating composition comprising a pigment according to claim 3, a film-forming material, and a liquid carrier.

15. A coating composition comprising a pigment according to claim 4, a film-forming material, and a liquid carrier.

16. A coating composition comprising a pigment according to claim 5, a film-forming material, and a liquid carrier.

17. A coating composition comprising a pigment according to claim 6, a film-forming material, and a liquid carrier.

18. A coating composition comprising a pigment according to claim 7, a film-forming material, and a liquid carrier.

19. A coating composition comprising a pigment according to claim 8, a film-forming material, and a liquid carrier.

20. A coating composition comprising a pigment according to claim 9, a film-forming material, and a liquid carrier.

* * * * *